(12) United States Patent
Liang et al.

(10) Patent No.: US 11,088,738 B2
(45) Date of Patent: Aug. 10, 2021

(54) COMMUNICATION METHOD AND NETWORK DEVICE

(71) Applicant: HUAWEI TECHNOLOGIES CO., LTD., Shenzhen (CN)

(72) Inventors: Jinyao Liang, Shenzhen (CN); Ting Wang, Shanghai (CN); Yuanjie Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 92 days.

(21) Appl. No.: 16/368,812

(22) Filed: Mar. 28, 2019

(65) Prior Publication Data

US 2019/0229783 A1    Jul. 25, 2019

Related U.S. Application Data

(63) Continuation of application No. PCT/CN2017/103711, filed on Sep. 27, 2017.

(30) Foreign Application Priority Data

Sep. 28, 2016 (CN) .......................... 201610868048.3

(51) Int. Cl.
*H04B 7/0426* (2017.01)
*H04B 7/06* (2006.01)
(Continued)

(52) U.S. Cl.
CPC ......... *H04B 7/0465* (2013.01); *H04B 7/0417* (2013.01); *H04B 7/0426* (2013.01);
(Continued)

(58) Field of Classification Search
None
See application file for complete search history.

(56) References Cited

U.S. PATENT DOCUMENTS

2006/0128309 A1* 6/2006 Dateki ................. H04B 7/0697
455/41.3
2008/0080634 A1 4/2008 Kotecha et al.
(Continued)

FOREIGN PATENT DOCUMENTS

CN    102938687 A    2/2013
CN    103167508 A    6/2013
(Continued)

OTHER PUBLICATIONS

LG Electronics: "Discussions on non-precoded CSI-RS codebook design for eFD-MIMO", 3GPP Draft; R1-166843, vol. RAN WG1, No. Gothenburg, Sweden; Aug. 13, 2016, XP051132907, 6 pages.
(Continued)

*Primary Examiner* — Kodzovi Acolatse
*Assistant Examiner* — The Hy Nguyen
(74) *Attorney, Agent, or Firm* — Kilpatrick Townsend & Stockton LLP

(57) ABSTRACT

Embodiments of the present invention provide a communication method. A first network device configures power configuration information for each of at least two precoding matrix groups, and sends the power configuration information to a second network device. The power configuration information is used to indicate a power configuration of a corresponding precoding matrix group of the at least two precoding matrix groups, and the at least two precoding matrix groups belong to a same resource used to measure channel state information CSI. When the second network device performs CSI measurement, different power values of different precoding matrix groups can be considered, thereby increasing accuracy of the CSI measurement.

4 Claims, 3 Drawing Sheets

S201: A first network device configures power configuration information for each of at least two precoding matrix groups, where the power configuration information is used to indicate a power configuration of a corresponding precoding matrix group of the at least two precoding matrix groups, and the at least two precoding matrix groups belong to a same resource used to measure CSI S202: The first network device sends the power configuration information to a second network device

(51) Int. Cl.
*H04B 7/0456* (2017.01)
*H04W 52/54* (2009.01)
*H04W 52/32* (2009.01)
*H04B 7/0417* (2017.01)
*H04B 17/10* (2015.01)

(52) U.S. Cl.
CPC ......... *H04B 7/0456* (2013.01); *H04B 7/0478* (2013.01); *H04B 7/0626* (2013.01); *H04B 7/0639* (2013.01); *H04B 17/101* (2015.01); *H04W 52/325* (2013.01); *H04W 52/54* (2013.01)

(56) References Cited

U.S. PATENT DOCUMENTS

| | | | |
|---|---|---|---|
| 2012/0201282 A1 | 8/2012 | Li et al. | |
| 2013/0265899 A1* | 10/2013 | Sayana | H04B 7/024 370/252 |
| 2013/0272250 A1 | 10/2013 | Shimezawa et al. | |
| 2014/0056282 A1 | 2/2014 | Sun et al. | |
| 2015/0341100 A1* | 11/2015 | Kwak | H04B 7/0626 370/329 |
| 2016/0218782 A1* | 7/2016 | Janis | H04B 7/0469 |
| 2016/0277081 A1* | 9/2016 | Wei | H04B 7/0639 |
| 2017/0201363 A1* | 7/2017 | Son | H04B 7/0639 |
| 2017/0201406 A1 | 7/2017 | Wu et al. | |
| 2018/0212660 A1* | 7/2018 | Gao | H04L 5/0023 |
| 2018/0241445 A1* | 8/2018 | Li | H04B 7/0456 |

FOREIGN PATENT DOCUMENTS

| | | |
|---|---|---|
| CN | 103716078 A | 4/2014 |
| CN | 104105211 A | 10/2014 |
| WO | 2016049916 A1 | 4/2016 |
| WO | 2016091310 A1 | 6/2016 |

OTHER PUBLICATIONS

Intel Corporation, "Enhancements and evaluation of CS/CB CoMP", 3GPP TSG RAN WG1 Meeting #86 R1-166548, Gothenburg, Sweden, Aug. 22-26, 2016, total 5 pages.

LG Electronics; "Discussion on enhancements for CS/CB with FD-MIMO", 3GPP TSG RAN WG1 Meeting #86 R1-166866, Gothenburg, Sweden Aug. 22-26, 2016, total 2 pages.

3GPP TS 36.331 V13.0.0 (Dec. 2015); 3rd Generation Partnership Project; Technical Specification Group Radio Access Network; Evolved Universal Terrestrial Radio Access (E-UTRA); Radio Resource Control (RRC); Protocol specification (Release 13), total 507 pages.

3GPP TS 36.213 V13.2.0 (Jun. 2016); 3rd Generation Partnership Project; Technical Specification Group Radio Access Network; Evolved Universal Terrestrial Radio Access (E-UTRA); Physical layer procedures(Release 13), total 381 pages.

* cited by examiner

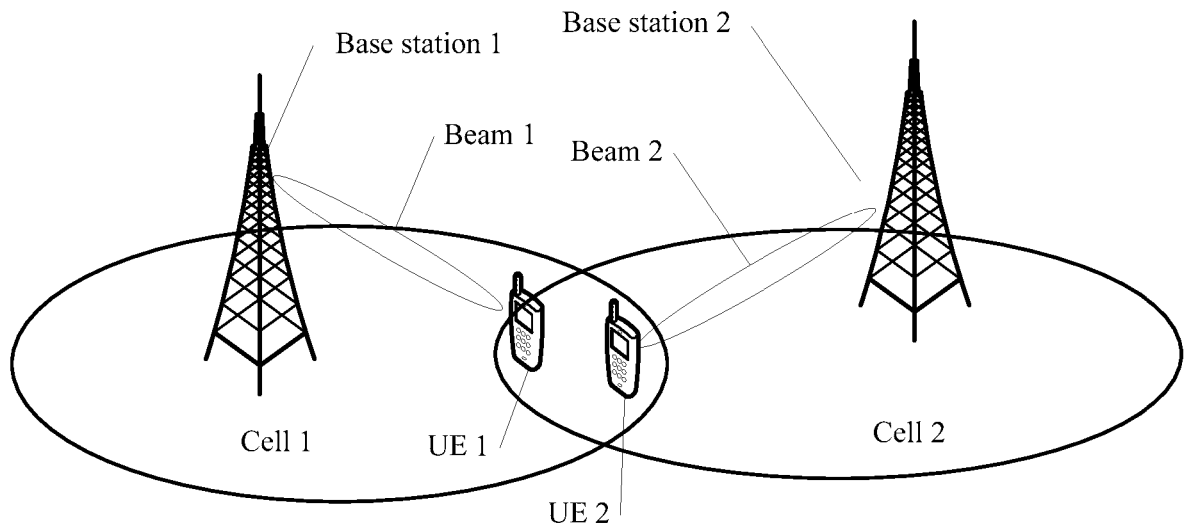

FIG. 1

S201: A first network device configures power configuration information for each of at least two precoding matrix groups, where the power configuration information is used to indicate a power configuration of a corresponding precoding matrix group of the at least two precoding matrix groups, and the at least two precoding matrix groups belong to a same resource used to measure CSI S202: The first network device sends the power configuration information to a second network device

FIG. 2

COMMUNICATION METHOD AND NETWORK DEVICE

CROSS-REFERENCE TO RELATED APPLICATIONS

This application is a continuation of International Application No. PCT/CN2017/103711, filed on Sep. 27, 2017, which claims priority to Chinese Patent Application No. 201610868048.3, filed on Sep. 28, 2016. The disclosures of the aforementioned applications are hereby incorporated by reference in their entireties.

TECHNICAL FIELD

Embodiments of the present invention relate to wireless communications technologies, and in particular, to a communication method and a network device.

BACKGROUND

Coordinated multipoint transmission (coordinated multiple point transmission, CoMP) is one of important technologies used to implement high-speed data transmission, and is particularly applicable to a next generation mobile communications system requiring a large capacity and high quality communication.

In the CoMP technology, through multi-cell coordinated processing, interference from an adjacent cell to user equipment (user equipment, UE) of a serving cell is converted to a wanted signal, or interference from an adjacent cell is avoided or reduced, thereby increasing a data transmission rate of a system and expanding coverage of a cell. In specific implementations of the CoMP, for example, joint transmission (Joint Transmission) and coordinated scheduling and beamforming (Coordinated Scheduling and Beamforming, CS/CB), the UE needs to measure channel state information (Channel State Information, CSI) of each cell. The UE reports a CSI measurement result to a base station of the serving cell. The base station of the serving cell preprocesses, with reference to the CSI measurement result by using a precoding matrix applicable to the UE, data to be sent to the UE, thereby increasing a system capacity, and reducing complexity and overheads of data reception.

However, the CSI measurement result in the prior art is not accurate. Consequently, actual performance of a precoding matrix finally selected by the base station is poor, and an expected optimization effect cannot be achieved.

SUMMARY

Embodiments of the present invention provide a communication method and a network device, to increase accuracy of CSI measurement.

According to a first aspect, an embodiment of the present invention provides a communication method, including:

configuring, by a first network device, power configuration information for each of at least two precoding matrix groups, where the power configuration information is used to indicate a power configuration of a corresponding precoding matrix group of the at least two precoding matrix groups, and the at least two precoding matrix groups belong to a same resource used to measure CSI; and sending, by the first network device, the power configuration information.

Specifically, the first network device may send the power configuration information to a second network device. The second network device may be a terminal device.

According to the communication method provided in the first aspect, the first network device may configure different power configuration information for different precoding matrix groups belonging to a same resource used to measure CSI. Then, when the second network device performs CSI measurement, different power values of the different precoding matrix groups can be considered, thereby increasing accuracy of the CSI measurement, so that a precoding matrix having good performance is selected and used for data transmission, a transmission process is optimized, and a system capacity is increased.

In a possible implementation of the first aspect, the sending, by the first network device, the power configuration information to a second network device includes: sending, by the first network device, signaling to the second network device, where the signaling includes the power configuration information.

The signaling may be common signaling or dedicated signaling. Particularly, the signaling may be broadcast signaling.

The power configuration information belonging to the at least two precoding matrix groups may be included in a same piece of signaling or in a plurality of pieces of signaling, and sent to the second network device.

In a possible implementation of the first aspect, the power configuration information includes indication information and status information; and the indication information is used to indicate a power value of the precoding matrix group corresponding to the power configuration information, and the status information is used to indicate an availability status of a precoding matrix in the precoding matrix group corresponding to the power configuration information.

The indication information may be a p-C parameter. The p-C parameter is a ratio of data power to power of a CSI reference signal (CSI-Reference Signal, CSI-RS).

In a possible implementation of the first aspect, the signaling includes a first domain and a second domain; and the first domain includes the indication information in the power configuration information corresponding to each of the precoding matrix groups, and the second domain includes the status information in the power configuration information corresponding to each of the precoding matrix groups.

In a possible implementation of the first aspect, the signaling includes at least two domains; and each of the at least two domains includes the indication information and the status information in the power configuration information corresponding to one of the precoding matrix groups.

In a possible implementation of the first aspect, the configuring, by a first network device, power configuration information for each of at least two precoding matrix groups includes: configuring, by the first network device, first power configuration information for a vertical precoding matrix group, and configuring second power configuration information for a horizontal precoding matrix group, where the vertical precoding matrix group and the horizontal precoding matrix group belong to a same resource used to measure CSI, the vertical precoding matrix group indicates a vertical beam after a horizontal direction is determined, and the horizontal precoding matrix group indicates a horizontal beam after a vertical direction is determined.

In a possible implementation of the first aspect, the configuring, by a first network device, power configuration information for each of at least two precoding matrix groups includes: configuring, by the first network device, power configuration information for each of at least two precoding matrix groups of a first-level beam, where the at least two precoding matrix groups of the first-level beam belong to a same resource used to measure CSI, and a precoding matrix in each of the precoding matrix groups of the first-level beam indicates a second-level beam belonging to the first-level beam.

Grouping is performed based on precoding matrices corresponding to the horizontal beam and the vertical beam, or grouping is performed based on precoding matrices corresponding to the first-level beam or the second-level beam, and the different power configuration information is configured for the different precoding matrix groups, so that signaling overheads can be reduced. Specifically, overheads of the status information are reduced.

According to a second aspect, an embodiment of the present invention provides a communication method, including:

receiving, by a second network device, power configuration information, where the power configuration information is configured by a first network device for each of at least two precoding matrix groups, the power configuration information is used to indicate a power configuration of a corresponding precoding matrix group of the at least two precoding matrix groups, and the at least two precoding matrix groups belong to a same resource used to measure CSI; and performing, by the second network device, CSI measurement based on the power configuration information.

In a possible implementation of the second aspect, the receiving, by a second network device, power configuration information includes: receiving, by the second network device, signaling from the first network device, where the signaling includes the power configuration information.

In a possible implementation of the second aspect, the power configuration information includes indication information and status information; and the indication information is used to indicate a power value of the precoding matrix group corresponding to the power configuration information, and the status information is used to indicate an availability status of a precoding matrix in the precoding matrix group corresponding to the power configuration information.

In a possible implementation of the second aspect, the signaling includes a first domain and a second domain; and the first domain includes the indication information in the power configuration information corresponding to each of the precoding matrix groups, and the second domain includes the status information in the power configuration information corresponding to each of the precoding matrix groups.

In a possible implementation of the second aspect, the signaling includes at least two domains; and each of the at least two domains includes the indication information and the status information in the power configuration information corresponding to one of the precoding matrix groups.

In a possible implementation of the second aspect, the receiving, by a second network device, power configuration information includes: receiving, by the second network device, first power configuration information configured for a vertical precoding matrix group, and receiving second power configuration information configured for a horizontal precoding matrix group, where the vertical precoding matrix group and the horizontal precoding matrix group belong to a same resource used to measure CSI, the vertical precoding matrix group indicates a vertical beam after a horizontal direction is determined, and the horizontal precoding matrix group indicates a horizontal beam after a vertical direction is determined.

In a possible implementation of the second aspect, the receiving, by a second network device, power configuration information includes: receiving, by the second network device, power configuration information configured for each of at least two precoding matrix groups of a first-level beam, where the at least two precoding matrix groups of the first-level beam belong to a same resource used to measure CSI, and a precoding matrix in each of the precoding matrix groups of the first-level beam indicates a second-level beam belonging to the first-level beam.

According to a third aspect, to implement the communication method according to the first aspect, an embodiment of the present invention provides a network device. The network device has a function of implementing the first network device in the communication method. The function may be implemented by hardware, or may be implemented by hardware executing corresponding software. The hardware or software includes one or more modules corresponding to the foregoing function.

In a possible implementation of the third aspect, the base station includes a plurality of function modules, configured to implement any communication method according to the first aspect. Different power configuration information is configured for different precoding matrix groups belonging to a same resource used to measure CSI, increasing accuracy of CSI measurement.

In a possible implementation of the third aspect, a structure of the network device includes a processor and a transceiver. The processor is configured to support the network device in performing a corresponding function in any communication method according to the first aspect. The transceiver is configured to support the network device in communicating with another network device. The network device may further include a memory. The memory is coupled to the processor, and configured to store a program instruction and data that are necessary for performing the communication method by the network device.

The network device may be a base station device.

According to a fourth aspect, to implement the communication method according to the second aspect, an embodiment of the present invention provides a network device. The network device has a function of implementing the second network device in the communication method. The function may be implemented by hardware, or may be implemented by hardware executing corresponding software. The hardware or software includes one or more modules corresponding to the foregoing function.

In a possible implementation of the fourth aspect, the network device includes a plurality of function modules, configured to implement any communication method according to the second aspect.

In a possible implementation of the fourth aspect, a structure of the network device includes a processor and a transceiver. The processor is configured to support the network device in performing a corresponding function in any communication method according to the first aspect. The transceiver is configured to support the network device in communicating with another network device. The network device may further include a memory. The memory is configured to be coupled to the processor, and stores a program instruction and data that are necessary for performing the communication method by the network device.

The network device may be user equipment or another terminal device.

According to a fifth aspect, an embodiment of the present invention provides a communications system. The system includes the network device according to the third aspect and the network device according to the fourth aspect.

The communications system may be a device-to-device (device to device, D2D) system.

According to a sixth aspect, an embodiment of the present invention provides a computer storage medium, configured to store a computer software instruction used by the network device according to the third aspect, where the computer software instruction includes a program designed for executing the first aspect.

According to a seventh aspect, an embodiment of the present invention provides a computer storage medium, configured to store a computer software instruction used by the network device according to the fourth aspect, where the computer software instruction includes a program designed for executing the second aspect.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a schematic diagram of an application scenario according to an embodiment of the present invention;

FIG. 2 is a schematic flowchart of a communication method according to an embodiment of the present invention;

DESCRIPTION OF EMBODIMENTS

Figure 3:
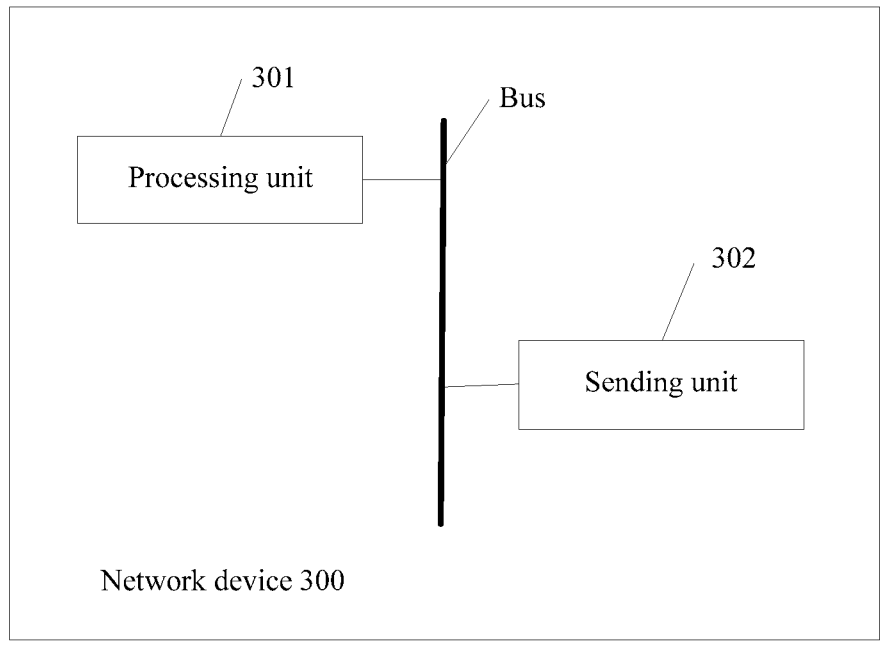
FIG. 3 is a schematic structural diagram of a network device 300 according to an embodiment of the present invention.

A technology described in the embodiments of the present invention may be applied to various wireless communications systems, for example, a 2G ($2^{nd}$ Generation) system such as a Global System for Mobile Communications (Global System for Mobile Communications, GSM), a 3G system such as a Wideband Code Division Multiple Access (Wideband Code Division Multiple Access, WCDMA) system, a 4G system such as a Long Term evolution (Long Term evolution, LTE) system, or a communications system using a new radio access technology (New RAT). The communications system using the new RAT includes an LTE-advanced (LTE advanced) system or another communications system using a 4.5G or 5G communications technology. This is not limited.

A base station in the embodiments of the present invention may be a base transceiver station (Base Transceiver Station, BTS) in GSM or CDMA, a Node B (NodeB) in WCDMA, or an evolved Node B (NodeB or eNB or e-NodeB, evolved Node B) in LTE, or a network device having a function of a base station in a subsequent LTE-advanced communications system.

UE in the embodiments of the present invention may include handheld devices having a wireless communication function, in-vehicle devices, wearable devices, computing devices, or other processing devices connected to a wireless modem, and various forms of user equipments, mobile stations (mobile station, MS), terminals (terminal), terminal devices (Terminal Equipment), and the like. For ease of description, the UE is referred to as "user equipment" or "UE" in this application.

In the embodiments of the present invention, a one-way communication link from the base station to the UE is defined as a down link, and a one-way communication link from the UE to the base station is an up link.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification indicates an "or" relationship between the associated objects.

The term "a plurality of" in the embodiments of the present invention means two or more. The descriptions such as "first" and "second" in the embodiments of the present invention are used only to illustrate and distinguish described objects without a specific order, do not indicate that a quantity of devices in the embodiments of the present invention is particularly limited, and cannot constitute any limitation on the embodiments of the present invention.

"Connection" used in the embodiments of the present invention means various connection manners such as direct connection or indirect connection. For example, various devices are connected by using a communications interface. This is not limited.

A "network" and a "system" in the embodiments of the present invention express a same concept. A communications system is a communications network.

FIG. 1 is a schematic diagram of an application scenario according to an embodiment of the present invention.

As shown in FIG. 1, a base station 1 manages a cell 1 (cell 1), and a base station 2 manages a cell 2 (cell 2). The cell 1 and the cell 2 have an overlapping area. The base station 1 and the base station 2 perform inter-cell coordination by using a CS/CB technology. UE 1 located in the overlapping area uses the cell 1 as a serving cell, and UE 2 uses the cell 2 as a serving cell. A beam 1 (beam 1) is a beam transmitted by the base station 1, and a beam 2 (beam 2) is a beam transmitted by the base station 2.

For example, the cell 1 is used as a primary cell, and the cell 2 is used as a cooperating cell. UE in the cell 1 may measure whether a beam in the cell 2 interferes with the UE, and then the base station 2 reduces the interference. For example, the UE 1 measures and obtains that the beam 2 is a strong interference beam, and the UE 1 feeds back information about the beam 2 to the base station 1. Then, the base station 1 notifies the base station 2, and the base station 2 learns of a status of interference from the beam 2 to the UE 1. Then, after transmitting data by using the beam 2, the base station 2 may reduce power of the beam 2.

To implement CS/CB, both the UE 1 and the UE 2 need to perform CSI measurement. A process of CSI measurement performed by the UE 2 is used as an example. The base station 2 delivers power configuration information to the UE 2. The UE 2 uses the power configuration information for the CSI measurement, and reports related CSI information to the base station 2. The CSI information may include one or more of a rank indicator (rank indicator, RI), a precoding matrix indication (precoding matrix indication, PMI), and a channel quality indicator (channel quality indicator, CQI).

Specifically, the UE 2 selects, from a codebook and based on the power configuration information and another parameter or preset rule, a precoding matrix that best matches a current channel status, and calculates channel quality after the precoding matrix is used. Subsequently, the UE 2 reports one or more pieces of CSI information, such as a PMI, a CQI, and an RI that are related to the precoding matrix, to the base station 2. The base station 2 may select, with reference to a CSI measurement result reported by the UE 2, a precoding matrix to preprocess data sent to the UE 2. To be specific, the base station 2 selects a beam to transmit data for the UE 2.

For example, the UE 2 reports to an RI, a PMI, and a CQI related to the beam 2, and the base station 2 may use the beam 2 to transmit data of the UE 2. If the beam 2 constitutes a strong interference beam for the UE 1, the base station 2 may reduce power of the beam 2 in a data transmission process, to reduce interference. However, performance of the beam 2 becomes poor because the power is reduced. In this case, the beam 2 may not be an optimal beam in an actual data transmission process of the UE 2, and a transmission effect is poor. It may be understood that the base station 1 also has a similar beam selection and anti-interference process. Details are not described.

Therefore, the embodiments of the present invention provide a communication method. A process of CSI measurement is optimized, and particularly, power configuration information is optimized, thereby increasing accuracy of the CSI measurement, and improving system performance.

The technical solutions provided in the embodiments of the present invention may be applied to various homogeneous network or heterogeneous network scenarios, and are also applicable to a device-to-device (device to device, D2D) system. A type of a transmission point in the application scenario is not limited, and the transmission point may be a communications device in the D2D system; or base station devices in various coordinated networks, for example, various base stations in inter-cell coordinated scenarios formed between macro base stations, between micro base stations, or between a macro base station and a micro base station. Further, a standard of a coordinated base station is not limited. For example, a 4G macro base station may coordinate with a 5G macro base station, or a 4G macro base station may coordinate with a 5G micro base station, or a 5G macro base station may coordinate with a 5G macro base station. Alternatively, the coordinated base station may be a coordinated network including other network devices, for example, a coordinated network including various relay devices, terminal devices, and/or base station devices.

FIG. 2 is a schematic flowchart of a communication method according to an embodiment of the present invention.

The communication method includes S201 and S202.

S201: A first network device configures power configuration information for each of at least two precoding matrix groups, where the power configuration information is used to indicate a power configuration of a corresponding precoding matrix group of the at least two precoding matrix groups, and the at least two precoding matrix groups belong to a same resource used to measure CSI.

S202: The first network device sends the power configuration information.

The first network device may send the power configuration information to a second network device. The second network device may use the received power configuration information for CSI measurement, including determining information such as a PMI, an RI, and a CQI, and reporting the information to a base station. Specifically, the second network device may use any CSI measurement method. This is not limited herein.

Optionally, the first network device may be various transmission points (transmission point, TP), for example, a network control device, a base station device, a relay device, or a terminal device having a function of a base station. The second network device may be a terminal device such as UE. Alternatively, the first network device and the second network device are communications devices at two ends of a D2D system. This is not limited in this embodiment of the present invention.

Optionally, in a multi-cell coordination scenario, the first network device may be a base station managing any cooperating cell, and the second network device is UE using the base station as a serving base station.

For ease of description, in this embodiment of the present invention, the first network device is used as a base station and the second network device is used as UE for description.

For brevity, a "matrix" used below is a "precoding matrix", and a "matrix group" is a "precoding matrix group".

The foregoing resource used to measure CSI includes a time domain resource and a frequency domain resource, is configured by the base station to UE to perform measurement related to a CSI process, and may also be referred to as a CSI measurement resource. Specifically, the resource used to measure CSI may include: a measurement resource such as a non-zero power channel state information reference signal (non zero power-channel state information, NZP-CSI) resource used to measure channel state information, or a channel state information-interference measurement (channel state information-interference measurement, CSI-IM) resource used for interference measurement, or a CSI process resource used to measure channel state information, or another measurement resource related to CSI measurement. This is not enumerated.

Each matrix group includes at least one matrix. The matrix belongs to a codebook (codebook). The codebook includes a plurality of different matrices. A same codebook may be preconfigured for both the base station and the UE. It may be understood that a maximum quantity of matrices that can be accommodated in the matrix group is a quantity of matrices in the codebook.

Optionally, the matrix groups include an available matrix and an unavailable matrix. In a possible case, if a matrix is an available matrix, CSI related to the matrix, for example, a PMI or an RI, is allowed to be reported to the base station. If a matrix is an unavailable matrix, CSI related to the matrix, for example, a PMI or an RI, is not allowed to be reported to the base station. In another possible case, the available matrix is a matrix that can use a power configuration of a power group, and the unavailable matrix is a matrix that cannot use a power configuration of the power group. The UE may perform CSI measurement only on the available matrix by using a corresponding power value.

In a possible implementation, matrices in the foregoing matrix groups may be selected from the entire codebook. To be specific, the codebook is grouped.

In a possible implementation, matrices in the foregoing matrix groups may be selected from a codebook subset. To be specific, the codebook subset is grouped. In this manner, a maximum quantity of matrices that can be accommodated in the matrix group is a quantity of matrices in the codebook subset. The codebook set is a set including some matrices selected from the codebook. The UE may perform CSI measurement by using a matrix in the codebook subset, and not perform CSI measurement on a matrix that is not in the codebook subset. To be specific, the codebook subset is used as a set of candidate measurement matrices for the UE.

It may be understood that available matrices included in each of the at least two matrix groups may be mutually non-repeated matrices, and unavailable matrices in different matrix groups may be repeated. Alternatively, each matrix group may include only an available matrix, and a power configuration of the matrix group is not applicable to a matrix not included in the matrix group by default. Alternatively, some or all of the matrix groups each may include only an unavailable matrix. It indicates that a power configuration of the matrix group achieves no effect on any matrix in the matrix group. Alternatively, in another implementation, some or all of available matrices included in the at least two matrix groups may be repeated, and the UE uses most recently received power configuration information. To be specific, if a same matrix corresponds to a plurality of pieces of different power configuration information, the power configuration information corresponding to the matrix is updated.

It is assumed that the codebook includes a matrix 1 to a matrix 8, and there are two matrix groups (a group 1 and a group 2). In a possible case, in the group 1, the matrix 1 and a matrix 2 are available matrices, and a matrix 3 to the matrix 8 are unavailable matrices; and in the group 2, a matrix 7 and the matrix 8 are available matrices, and the matrix 1 to a matrix 6 are unavailable matrices. In a possible case, the matrix 1 to a matrix 4 are available matrices in the group 1; and a matrix 5 to the matrix 8 are available matrices in the group 2. In a possible case, the matrix 1 to the matrix 8 are unavailable matrices in the group 1; and the matrix 1 to the matrix 8 are available matrices in the group 2. This indicates that none of the matrix 1 to the matrix 8 can use a power configuration of the group 1, or even if a power configuration of the group 1 can be used, CSI obtained through calculation by using the power configuration of the group 1 is not allowed to be reported. In a scenario, the power configuration of the group 1 or a power configuration of the group 2 achieves no effect on any matrix in the codebook. To be specific, the matrix 1 to the matrix 8 are unavailable matrices in the group 1; and the matrix 1 to the matrix 8 are unavailable matrices in the group 2. In this scenario, the UE may select an optimal matrix by using historically received power configuration information. In a possible case, in the group 1, the matrix 1 to the matrix 3 are available matrices, and the matrix 4 to the matrix 8 are unavailable matrices; and in the group 2, the matrix 1 to the matrix 4 are available matrices, and the matrix 5 to the matrix 8 are unavailable matrices. In addition, assuming that the UE first receives power configuration information 1 corresponding to the group 1 and then receives power configuration information 2 corresponding to the group 2, the UE uses the power configuration information 1 to process the matrix 1 to the matrix 3, and uses the power configuration information 2 to process the matrix 4. Optionally, if it is assumed that the codebook subset of the codebook includes the matrix 1 to the matrix 4, the matrix 1 and the matrix 2 may be available matrices and the matrix 3 and the matrix 4 may be unavailable matrices included in the group 1; and the matrix 3 and the matrix 4 may be available matrices and the matrix 1 and the matrix 2 is an unavailable matrix included in the group 2. Other cases are similar to the foregoing examples of grouping of the codebook, and details are not described.

The optimal matrix is a matrix having best performance that is determined by the UE. The UE reports information about the matrix to the base station, and the base station finally determines whether a beam corresponding to the matrix is used to transmit data of the UE.

Optionally, in an implementation of the present invention, each piece of the power configuration information includes indication information and status information; and the indication information is used to indicate a power value of a matrix group corresponding to the power configuration information, and the status information is used to indicate an availability status of a matrix in the matrix group corresponding to the power configuration information.

The power value of the matrix group is a power value corresponding to each available matrix in the matrix group. When the matrix group includes two or more available matrices, power values corresponding to the available matrices are the same. The power value corresponding to the available matrix may be considered as a power value of a beam corresponding to the available matrix, and may be obtained by the UE based on content of the indication information and through operations such as calculation.

The indication information may be specifically a p-C parameter. The p-C parameter is a ratio of data power to power of a CSI reference signal (CSI-Reference Signal, CSI-RS). The CSI-RS is sent by the base station to the UE. The UE may obtain the power of the CSI-RS through measurement, and the UE may obtain, through calculation based on the p-C parameter sent by the base station, data power corresponding to each matrix in the matrix group. The data power is power of a beam corresponding to the matrix.

Subsequently, the UE may select the optimal matrix based on the data power determined by using the p-C parameter. For example, the UE may compare, in a polling manner, signal to interference plus noise ratios (signal to interference plus noise ratio, SINR) of all the matrices in the codebook or throughput rates obtained through calculation based on the SINRs, to select the optimal matrix. The SINR may be obtained through calculation by using the data power.

It may be understood that a specific form of the indication information is not particularly limited in this embodiment of the present invention. Optionally, the indication information may be a value such as −8 db or 6 db; or may be a ratio such as 1/6 or 7/6. The ratio is used to represent a proportional relationship of a currently determined power value of a matrix group to a historical power value of the matrix group, and the UE can obtain, through calculation based on the historical power value and indication information of the matrix group, a power value of the matrix group that is currently to be delivered by the base station. Optionally, the UE may negotiate with the base station to determine a value or ratio represented by the content of the indication information, to determine the power value of the matrix group. For example, the indication information may be n bits. Different values of the n bits represent different values or ratios. Assuming that the indication information is 1 bit, the UE and the base station may agree on that "1" on the bit represents a ratio 1, and "0" represents a ratio 2. The base station and the UE both may prestore the correspondence.

It may be understood that a specific value of the power value of the matrix group that is indicated by the indication information is not particularly limited in this embodiment of the present invention either. The base station may determine an appropriate power value based on conditions such as beam performance in the cell and an actual reception status of the UE.

The base station may set different power values for different matrix groups. For example, at least one matrix corresponding to an interference beam is grouped into a matrix group, and power configuration information indicating power reduction is set for the matrix group. At least one matrix corresponding to another normal beam is grouped into another matrix group, and a power value indicated by power configuration information corresponding to the matrix group is different from the power value of the matrix group corresponding to the interference beam.

Specifically, the base station may adjust a power value corresponding to a matrix corresponding to a beam, and deliver, to the UE, power configuration information indicating the adjusted power value. For example, the power value corresponding to the at least one matrix corresponding to the interference beam is adjusted: The base station may obtain information about the interference beam causing interference to a cooperating cell, then adjust the power value of the at least one matrix corresponding to the interference beam, and use matrices having a same adjustment value of the power value as a matrix group. Power configuration information corresponding to the matrix group includes related information of the adjusted power value. Specifically, indication information in the power configuration information may be used to indicate a power adjustment value of a matrix in the matrix group; or the indication information may be used to indicate a power adjustment ratio of a matrix in the matrix group. Then, the UE may perform CSI measurement based on a power configuration parameter carrying the power adjustment value, select the optimal matrix, and report the optimal matrix to the base station for determining. For example, when there is no interference beam, a power value configured by the base station for each matrix group is 6 dB; after the base station determines that there is interference beam, the base station reduces a power value of the interference beam, and the base station may configure two power values 6 dB and 4 dB respectively for a matrix group 1 and a matrix group 2. A matrix corresponding to the interference beam belongs to the matrix group 2.

Optionally, in an implementation, the indication information may be an offset (offset). The offset refers to an offset value or ratio relative to a power value of a matrix group in the at least two matrix groups. Assuming that indication information in power configuration information of the matrix group 1 is specific data, for example, −8 db, indication information of the matrix group 2 may be 2 db, and this indicates that an offset relative to −8 db is 2 db; alternatively, indication information in power configuration information of the matrix group 1 is a ratio, for example, 1/7, indication information of the matrix group 2 may be 1/2, and this indicates that an offset of 1/2 occurs based on 1/7, that is, an offset is 1/7*1/2; alternatively, assuming that indication information in power configuration information of the matrix group 1 is specific data, for example, −8 db, indication information of the matrix group 2 may be a ratio, for example, 1/7, and this indicates that an offset relative to −8 db is −8 db*1/7=−8/7 db.

The availability status of the matrix that is indicated by the status information means whether the matrix is available or unavailable, in other words, whether the matrix is an available matrix or an unavailable matrix. The base station and the UE may agree in advance on a representation rule of the status information. After receiving the status information, the UE may obtain an availability status of each matrix according to indication of the representation rule, and select an optimal matrix from available matrices. For example, the status information may be specifically a bitmap (bitmap) or a bit sequence. A length of the bit sequence may be the same as a quantity of matrices in a matrix group. Each bit in the bit sequence corresponds to an availability status of a matrix in the matrix group. For example, 1 may be used to represent that the matrix corresponding to this bit is available, and 0 may be used to represent that the matrix corresponding to this bit is unavailable Optionally, if the base station determines that power of a transmitted beam does not need to be adjusted, the base station may resend, to the UE, power configuration information that is most recently sent to the UE. Alternatively, the base station sets all matrices in any matrix group to be unavailable. For example, the status information is set to an all-zero sequence, and the UE selects an optimal matrix based on historically obtained power configuration information, for example, most recently received power configuration information.

Optionally, the power configuration information may be included in one or more pieces of signaling (signaling) and sent to the UE. The signaling is a message (message). The signaling may be an RRC layer signaling, or referred to as an RRC layer message; or may be physical layer signaling, or referred to as a physical layer message. The RRC layer signaling or the physical layer signaling each includes common signaling and dedicated signaling. Any type of signaling may carry the power configuration information. Optionally, the power configuration information may be included in broadcast signaling, and the broadcast signaling is one type of common signaling. If the power configuration information is included in the dedicated signaling, it indicates that the base station sends the power configuration information to specific UE.

If the power configuration information is sent by using the broadcast signaling, all UEs served by the base station receive the same broadcast signaling and obtain the power configuration information included in the broadcast signaling. Therefore, signaling overheads are small. In addition, the broadcast signaling is semi-statically configured with a relatively long configuration period, so that the broadcast signaling does not need to be frequently replaced, thereby saving system resources.

Optionally, the base station sends a power configuration information list to the UE. The power configuration information list includes the power configuration information configured by the base station for each of the at least two matrix groups.

Optionally, in a possible implementation, the signaling including the power configuration information includes a first domain and a second domain. The first domain includes the indication information in the power configuration information corresponding to each of the matrix groups; and the second domain includes the status information in the power configuration information corresponding to each of the matrix groups.

Specifically, because the base station configures at least two matrix groups, and the power configuration information corresponding to each matrix group includes the indication information and the status information, indication information in a plurality of pieces of power indication information corresponding to different matrix groups may be located in a same location area in one piece of signaling; and status information in the plurality of pieces of power indication information may be located in another location area in the signaling.

Optionally, in another possible implementation, the signaling including the power configuration information includes at least two domains; and each of the at least two domains includes the indication information and the status information in the power configuration information corresponding to one of the matrix groups.

Specifically, in this implementation, all content of one piece of power configuration information is located in a same location area in one piece of signaling; and all content of another piece of power configuration information is located in another location area of the signaling.

Optionally, in another implementation of the present invention, the power configuration information may alternatively be included in a plurality of pieces of signaling and sent to the UE. It may be understood that in a scenario in which the power configuration information is sent by using a plurality of pieces of signaling, there may be a plurality of sending manners, any sending manner falls within the protection scope of the embodiments of the present invention, and the sending manners are not enumerated. For example, one piece of signaling includes only power configuration information corresponding to one matrix group, and another piece of signaling includes power configuration information corresponding to another matrix group. Alternatively, one piece of signaling includes the indication information in the power configuration information corresponding to all the matrix groups, and another piece of signaling includes the status information in the power configuration information corresponding to all the matrices groups. Optionally, all the indication information may be included in an indication information list, and all the status information may be included in a status information list. Alternatively, one piece of signaling includes power configuration information corresponding to some matrix groups, and another piece of signaling includes power configuration information corresponding to other matrix groups.

It may be understood that when a precoding matrix group includes a plurality of precoding matrices, a power value corresponding to all available matrices in the matrix group can be indicated by using only one piece of indication information, thereby reducing a quantity of bits occupied by the indication information, and saving signaling resources.

The following describes composition of the power configuration information in this embodiment of the present invention by using an actual codebook as an example.

Table 1 is a schematic diagram of a codebook corresponding to a 4-antenna port. As shown in Table 1, the codebook includes a total of 16 precoding matrices from bit 0 to bit 15. $i_1$ represents an index number of a W1 matrix, $i_2$ represents an index number of a W2 matrix, and $W_0^{\{124\}}/\sqrt{3}$, $W_1^{\{123\}}/\sqrt{3}$, ..., and $W_1^{\{123\}}/\sqrt{3}$ represent a precoding matrix under a rank.

It is assumed that the base station configures two matrix groups (a group 1 and a group 2) for a CSI measurement resource, in the group 1, a matrix on bit 0 to a matrix on bit 3 are available matrices, a matrix on bit 4 to a matrix on bit 15 are unavailable matrices, and a power value configured for the group 1 is −8 db. In this case, power configuration information of the group 1 may be represented as:

TABLE 2

| Indication information | Status information |
|---|---|
| −8 dB | 1111 0000 0000 0000 |

The status information is a bit sequence. Bit 0 to bit 15 from the left to the right sequentially indicate availability statuses of a matrix on bit 0 to a matrix on bit 15, "1" is used to represent that a matrix is available, and "0" is used to represent that a matrix is unavailable.

Similarly, it is assumed that in the group 2, a matrix on bit 4 to a matrix on bit 7 are available matrices, a matrix on bit 0 to a matrix on bit 3 and a matrix on bit 8 to a matrix on bit 15 are unavailable matrices, and a power value configured for the group 2 is 6 db. In this case, power configuration information of the group 2 may be represented as:

TABLE 3

| Indication information | Status information |
|---|---|
| 6 dB | 0000 1111 0000 0000 |

Then, signaling including the power configuration information of the group 1 and the group 2 may be represented as:

TABLE 4

| Group 1 | | Group 2 | |
|---|---|---|---|
| Indication information | Status information | Indication information | Status information |
| −8 dB | 1111 0000 0000 0000 | 6 dB | 0000 1111 0000 0000 | or

TABLE 5

| Indication information | | Status information | |
|---|---|---|---|
| Group 1 | Group 2 | Group 1 | Group 2 |
| −8 dB | 6 dB | 1111 0000 0000 0000 | 0000 1000 0000 0000 |

TABLE 1

| | $i_2$ | | | | | | | |
|---|---|---|---|---|---|---|---|---|
| $i_1$ | 0 | 1 | 2 | 3 | 4 | 5 | 6 | 7 |
| 0 | $W_0^{\{124\}}/\sqrt{3}$ | $W_1^{\{123\}}/\sqrt{3}$ | $W_2^{\{123\}}/\sqrt{3}$ | $W_3^{\{123\}}/\sqrt{3}$ | $W_4^{\{124\}}/\sqrt{3}$ | $W_5^{\{124\}}/\sqrt{3}$ | $W_6^{\{134\}}/\sqrt{3}$ | $W_7^{\{134\}}/\sqrt{3}$ |
| | $i_2$ | | | | | | | |
| $i_1$ | 8 | 9 | 10 | 11 | 12 | 13 | 14 | 15 |
| 0 | $W_8^{\{124\}}/\sqrt{3}$ | $W_9^{\{134\}}/\sqrt{3}$ | $W_{10}^{\{123\}}/\sqrt{3}$ | $W_{11}^{\{134\}}/\sqrt{3}$ | $W_{12}^{\{123\}}/\sqrt{3}$ | $W_{13}^{\{123\}}/\sqrt{3}$ | $W_{14}^{\{123\}}/\sqrt{3}$ | $W_{15}^{\{123\}}/\sqrt{3}$ |

In a possible scenario, each matrix in the codebook has a different power configuration. To be specific, each matrix group includes only one available matrix, and each available matrix corresponds to a different power value. In this scenario, signaling sent by the base station includes power configuration information corresponding to the matrix on bit 0 to the matrix on bit 15 in the codebook. Specific content of the signaling is shown as follows:

TABLE 6

| Indication information | Status information |
|---|---|
| −8 dB | 1000 0000 0000 0000 |
| −7 dB | 0100 0000 0000 0000 |
| −2 dB | 0010 0000 0000 0000 |
| 3 dB | 0001 0000 0000 0000 |
| −6 dB | 0000 1000 0000 0000 |
| ... | ... |
| 8 dB | 0000 0000 0000 0001 |

In another implementation, it is assumed that a codebook subset of the codebook of Table 1 is:

$$W_0^{\{124\}}/\sqrt{3} \quad W_1^{\{123\}}/\sqrt{3} \quad W_2^{\{123\}}/\sqrt{3} \quad W_3^{\{123\}}/\sqrt{3} \quad W_4^{\{124\}}/\sqrt{3} \quad W_5^{\{124\}}/\sqrt{3} \quad W_6^{\{134\}}/\sqrt{3} \quad W_7^{\{134\}}/\sqrt{3}$$

To be specific, the UE may perform CSI measurement on only the eight matrices $W_0$ to $W_7$. The codebook subset may be represented as {1111111100000000}. Assuming that a group 1 and a group 2 are obtained after the codebook subset is divided, power configuration information of the group 1 and the group 2 may be shown by example as:

| Group 1 | | Group 2 | |
|---|---|---|---|
| Indication information | Status information | Indication information | Status information |
| −8 dB | 1111 0000 | 6 dB | 0000 1111 |

It may be understood that in an actual application scenario, power configuration information may include only a specific value or sequence, and the UE autonomously determines values or sequences representing indication information and status information. Table 1 to Table 6 are only illustrative and used for description, and cannot constitute any limitation on a format and content of the power configuration information or the signaling in this embodiment of the present invention. For example, the "indication information" and the "status information" in Table 2 are only used for description, and actual power configuration information does not include content in the first row of Table 2. Next, an arrangement sequence of a plurality of pieces of power configuration information in signaling and an arrangement sequence of various information in the power configuration information are not limited in this embodiment of the present invention. Table 2 to Table 6 show only possible arrangement sequences by way of example.

Optionally, in an implementation of the present invention, the base station configures first power configuration information for a vertical matrix group, and configures second power configuration information for a horizontal matrix group. The vertical matrix group and the horizontal matrix group belong to a same resource used to measure CSI, the vertical matrix group indicates a vertical beam after a horizontal direction is determined, and the horizontal matrix group indicates a horizontal beam after a vertical direction is determined.

Further, the vertical matrix group or the horizontal matrix group may further be grouped, and different power configurations are performed on the vertical matrix group or the horizontal matrix group that is grouped again. To be specific, the vertical beam or the horizontal beam is further classified and different power values are set for the classified beams. For example, the vertical matrix group is divided into a vertical matrix group 1 and a vertical matrix group 2. Power configuration information 1 is set for the vertical matrix group 1, and power configuration information 2 is set for the vertical matrix group 1. Content of the power configuration information 1 is different from that of the power configuration information 2. Differences include: in the two pieces of power configuration information, indication information indicates different power values, and status information indicates different available vertical matrices.

Optionally, in an implementation of the present invention, the base station configures power configuration information for each of at least two matrix groups of a first-level beam.

A matrix in each of the matrix groups of the first-level beam indicates a second-level beam belonging to the first-level beam. The first-level beam may also be referred to as a wide beam or a W1 beam, and the second-level beam may also be referred to as a narrow beam or a W2 beam.

Optionally, status information in power configuration information corresponding to one matrix group of the first-level beam may be an indicator bit. The indicator bit is used to represent that all matrices in the matrix group are available or unavailable, in other words, availability statuses of all the matrices are the same. For example, when the indicator bit is "1", it represents that all matrices are available, in other words, the matrix group is available; when the indicator bit is "0", it represents that all matrices are unavailable, in other words, the matrix group is unavailable. In this case, availability statuses of all the matrix groups of the first-level beam may be represented by using a sequence. In addition, the base station may configure a power value for each of the matrix groups of the first-level beam. To be specific, indication information in each piece of the power configuration information is different. All the indication information may be used as an indication information list.

Optionally, the base station may group a plurality of first-level beams, and set a power value for each group of first-level beams. To be specific, the base station may set one piece of power configuration information for a matrix group corresponding to each first-level beam group. In this case, matrices corresponding to all second-level beams subordinate to each first-level beam in the first-level beam group all have a same power value.

The base station may further group at least one second-level beam belonging to a same first-level beam. To be specific, one or more matrices corresponding to the second-level beams are used as a matrix group, and power configuration information is set for each matrix group, so that each group of second-level beams has a different power value.

For example, in a codebook shown in Table 7, $i_1$ represents first-level beams (which are referred to as a W1 beam below) that respectively have index numbers 0 to 15, $i_2$ represents second-level beams (which are referred to as a W2 beam below) that respectively have index numbers 0 to 15 and that are under each W1 beam, and $W_{i_1,0}^{(1)}$, $W_{i_1,8}^{(1)}$ ... represent a precoding matrix corresponding to each W2 beam. To be specific, if $i_1$ is determined, the W2 beam has 16 possible forms.

TABLE 7

| | $i_2$ | | | |
|---|---|---|---|---|
| $i_1$ | 0 | 1 | 2 | 3 |
| 0-15 | $W_{i_1,0}^{(1)}$ | $W_{i_1,8}^{(1)}$ | $W_{i_1,16}^{(1)}$ | $W_{i_1,24}^{(1)}$ |
| | $i_2$ | | | |
| $i_1$ | 4 | 5 | 6 | 7 |
| 0-15 | $W_{i_1+8,2}^{(1)}$ | $W_{i_1+8,10}^{(1)}$ | $W_{i_1+8,18}^{(1)}$ | $W_{i_1+8,26}^{(1)}$ |
| | $i_2$ | | | |
| $i_1$ | 8 | 9 | 10 | 11 |
| 0-15 | $W_{i_1+16,4}^{(1)}$ | $W_{i_1+16,12}^{(1)}$ | $W_{i_1+16,20}^{(1)}$ | $W_{i_1+16,28}^{(1)}$ |
| | $i_2$ | | | |
| $i_1$ | 12 | 13 | 14 | 15 |
| 0-15 | $W_{i_1+24,6}^{(1)}$ | $W_{i_1+24,14}^{(1)}$ | $W_{i_1+24,22}^{(1)}$ | $W_{i_1+24,30}^{(1)}$ | where $W_{m,n}^{(1)} = \frac{1}{2}\begin{bmatrix} v'_m \\ \varphi'_n v'_m \end{bmatrix}$ Case 1: Power indication information is configured for a matrix group corresponding to each W2 beam, and specific content of signaling delivered by the base station may be:

| | | |
|---|---|---|
| $i_2 = 0$ | −8 dB | 1111 0000 0000 0000 |
| $i_2 = 1$ | −7 dB | 0100 0000 1101 0000 |
| $i_2 = 2$ | −2 dB | 0010 0000 0000 0000 |
| $i_2 = 3$ | 3 dB | 0001 0000 0000 0000 |
| $i_2 = 4$ | −6 dB | 0000 1000 0000 0000 |
| ... | ... | ... |
| $i_2 = 15$ | 8 dB | 0000 0000 0000 0001 |

Case 2: Power indication information is configured for a matrix group corresponding to each W1 beam, and specific content of signaling delivered by the base station may be:

| | | |
|---|---|---|
| $i_1 = 0$ | −8 dB | 1 |
| $i_1 = 1$ | −7 dB | 0 |
| $i_1 = 2$ | −2 dB | 1 |
| $i_1 = 3$ | 3 dB | 0 |
| $i_1 = 4$ | −6 dB | 0 |
| ... | ... | ... |
| $i_1 = 15$ | 8 dB | 1 | or

| | |
|---|---|
| −8 −7 −2 3 −6 ... 8 | 10100 ... 1 | where 1 represents that a matrix group of W1 is available, and 0 represents that a matrix group of W1 is unavailable.

Case 3: Same power indication information is configured for several matrix groups of the W1 beam, and specific content of signaling delivered by the base station may be:

| | | | |
|---|---|---|---|
| −8 dB | 1111 0000 0000 0000 | 6 dB | 0000 1000 0000 0000 | or

| | | | |
|---|---|---|---|
| −8 dB | 6 dB | 1111 0000 0000 0000 | 0000 1000 0000 0000 |

It may be learned that in Case 2 or Case 3, availability statuses of matrices corresponding to all W2 beams under a W1 beam can be indicated by using only one indicator bit, thereby saving signaling overheads.

It may be understood that forms and content of signaling in the foregoing cases are merely examples and descriptions, and do not constitute any limitation on the embodiments of the present invention.

According to the communication method provided in this embodiment of the present invention, the first network device, for example, the base station, configures the power configuration information for each of the at least two precoding matrix groups, and sends the power configuration information to the second network device, for example, the UE. The power configuration information is used to indicate a power configuration of a corresponding precoding matrix group of the at least two precoding matrix groups, and the at least two precoding matrix groups belong to the same resource used to measure CSI. In this case, when the second network device performs CSI measurement, different power values of different precoding matrix groups can be considered, thereby increasing accuracy of the CSI measurement, so that a precoding matrix having good performance is selected and used for data transmission, a transmission process is optimized, and a system capacity is increased. Further, grouping is performed based on precoding matrices corresponding to the horizontal beam and the vertical beam, or grouping is performed based on precoding matrices corresponding to the first-level beam or the second-level beam, and the different power configuration information is configured for the different precoding matrix groups, so that signaling overheads can be reduced. Specifically, overheads of the status information are reduced.

FIG. 3 is a schematic structural diagram of a network device 300 according to an embodiment of the present invention.

The network device 300 may perform operations of the first network device or the base station in the method embodiment shown in FIG. 2.

The network device 300 includes a processing unit 301 and a sending unit 302.

The processing unit 301 may be configured to configure power configuration information for each of at least two precoding matrix groups, where the power configuration information is used to indicate a power configuration of a corresponding precoding matrix group of the at least two precoding matrix groups, and the at least two precoding matrix groups belong to a same resource used to measure CSI.

The sending unit 302 may be configured to send the power configuration information. For example, the sending unit 302 sends the power configuration information to a second network device.

The network device 300 may be a device such as a base station or a transmission point, and the second network device may be a device such as a terminal. Alternatively, the network device 300 and the second network device are devices at two ends of a D2D system. Details are not described herein.

The resource used to measure CSI includes a non-zero power channel state information reference signal resource used to measure channel state information, or a channel state information-interference measurement resource used for interference measurement, or a CSI process resource used to measure channel state information, or the like. Details are not described.

Optionally, the sending unit 302 may send signaling to the second network device. The signaling includes the power configuration information.

Optionally, the power configuration information includes indication information and status information. The indication information is used to indicate a power value of the precoding matrix group corresponding to the power configuration information, and the status information is used to indicate an availability status of a precoding matrix in the precoding matrix group corresponding to the power configuration information. For specific descriptions of the indication information and the status information, refer to related content in the embodiment shown in FIG. 2. Details are not described herein.

Optionally, the signaling includes a first domain and a second domain. The first domain includes the indication information in the power configuration information corresponding to each of the precoding matrix groups; and the second domain includes the status information in the power configuration information corresponding to each of the precoding matrix groups.

Optionally, the signaling includes at least two domains. Each of the at least two domains includes the indication information and the status information in the power configuration information corresponding to one of the precoding matrix groups.

For descriptions of specific content of the signaling including the power configuration information, refer to the related descriptions and examples in the embodiment shown in FIG. 2. Details are not described herein.

The signaling is a same piece of signaling; or the signaling is two or more pieces of signaling. To be specific, a plurality of pieces of power configuration information may be included in a same piece of signaling and sent to UE, or may be separately included in a plurality of pieces of signaling and sent to UE. For details, refer to related content in the embodiment shown in FIG. 2. Details are not described herein.

Optionally, in an implementation of the present invention, the processing unit 301 may configure first power configuration information for a vertical precoding matrix group, and configure second power configuration information for a horizontal precoding matrix group. The vertical precoding matrix group and the horizontal precoding matrix group belong to a same resource used to measure CSI, the vertical precoding matrix group indicates a vertical beam after a horizontal direction is determined, and the horizontal precoding matrix group indicates a horizontal beam after a vertical direction is determined. For specific descriptions of grouping, based on beam directions, matrices corresponding to beams and setting a power configuration parameter, refer to related content in the embodiment shown in FIG. 2. Details are not described herein.

Optionally, in an implementation of the present invention, the processing unit 301 may configure power configuration information for each of at least two precoding matrix groups of a first-level beam. The at least two precoding matrix groups of the first-level beam belong to a same resource used to measure CSI, and a precoding matrix in each of the precoding matrix groups of the first-level beam indicates a second-level beam belonging to the first-level beam. For specific descriptions of grouping first-level beams/second-level beams and setting a power configuration parameter, refer to related content in the embodiment shown in FIG. 2. Details are not described herein.

As shown in FIG. 3, units of the base station may be connected to each other by using a communications bus. Alternatively, units of the base station may be connected in another connection manner not shown in the figure. This is not particularly limited in this embodiment of the present invention.

In another embodiment of the present invention, in terms of hardware implementation, an operation of the processing unit 301 may be performed by a processor, and an operation of the sending unit 302 may be performed by a transmitter or a transceiver. The processing unit 302 may be embedded in or independent of the processor of the base station in a hardware form, or may be stored in a memory of the base station in a software form, so that the processor invokes and performs operations corresponding to the foregoing units.

Figure 4:
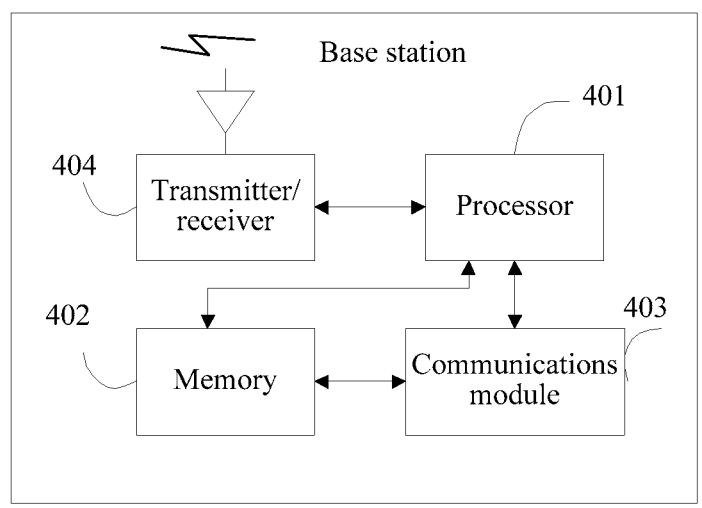
FIG. 4 is a schematic diagram of a possible design structure of a base station according to an embodiment of the present invention.

That the network device 300 is a base station is used as an example, and FIG. 4 is a schematic diagram of a possible design structure of a base station according to an embodiment of the present invention.

The base station includes a processor 401, a memory 402, a communications module 403, and a transmitter/receiver 404. The processor 401 is configured to: control and manage actions of a control device, and perform various functions to support a communication service provided by the control device. For example, the processor 401 is configured to support a network device 400 in performing an operation of the first network device or the network device in the embodiment shown in FIG. 2, and/or another process performed by the first network device or the network device used for the technology described in this specification.

The memory 402 is configured to store program code and data that are used by the network device to perform the communication method provided in the embodiments of the present invention. The program code includes a computer operation instruction. The program code stored in the memory 402 may be executed by the processor 401.

The transmitter/receiver 404 is configured to support the network device 400 in communicating with a terminal device such as UE.

The communications module 403 is configured to support the base station in communicating with another network entity, for example, communicating with a core network device or another network device.

Functions of the transmitter/receiver 404 and the communications module 403 may be implemented by a transceiver. The transceiver supports the base station in communicating with other various communications devices.

It may be understood that FIG. 4 shows only a simplified design of the control device. During actual application, the control device may include any quantities of transmitters, receivers, processors, controllers, memories, communications modules, and the like. Details are not described herein.

The network device or the base station shown in the embodiment of FIG. 3 or FIG. 4 is used to configure the power configuration information for each of the at least two precoding matrix groups, and send the power configuration information to the second network device, for example, the UE. The power configuration information is used to indicate a power configuration of a corresponding precoding matrix group of the at least two precoding matrix groups, and the at least two precoding matrix groups belong to the same resource used to measure CSI. In this case, when the second network device performs CSI measurement, different power values of different precoding matrix groups can be considered, thereby increasing accuracy of the CSI measurement, so that a precoding matrix having good performance is selected and used for data transmission, a transmission process is optimized, and a system capacity is increased.

Figure 5:
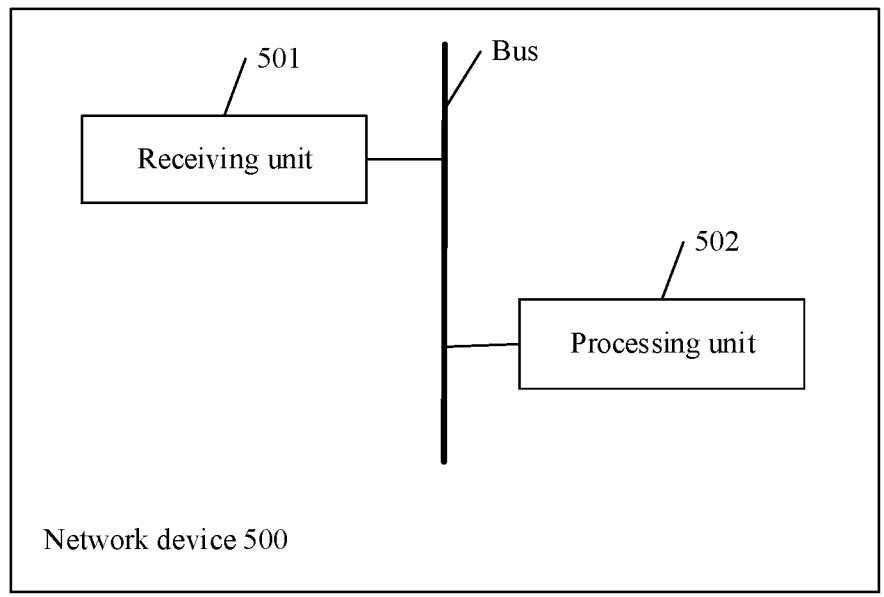
FIG. 5 is a schematic structural diagram of a network device 500 according to an embodiment of the present invention.

FIG. 5 is a schematic structural diagram of a network device 500 according to an embodiment of the present invention.

The network device 500 may perform operations of the second network device or the UE in the embodiment shown in FIG. 2.

The network device 500 includes a receiving unit 501 and a processing unit 502.

The receiving unit 501 is configured to receive power configuration information, where the power configuration information is configured by a first network device for each of at least two precoding matrix groups, the power configuration information is used to indicate a power configuration of a corresponding precoding matrix group of the at least two precoding matrix groups, and the at least two precoding matrix groups belong to a same resource used to measure CSI.

For content of the power configuration information and specific descriptions of signaling including the power configuration information, refer to related content in other embodiments of the present invention. Details are not described herein.

The processing unit 502 is configured to perform CSI measurement based on the power configuration information.

For specific content of the CSI measurement, refer to related content in other embodiments of the present invention. Details are not described herein.

As shown in FIG. 5, units of the base station may be connected to each other by using a communications bus. Alternatively, units of the base station may be connected in another connection manner not shown in the figure. This is not particularly limited in this embodiment of the present invention.

In another embodiment of the present invention, in terms of hardware implementation, an operation of the receiving unit 501 may be performed by a receiver or a transceiver, and an operation of the processing unit 502 may be performed by a processor. The processing unit 502 may be embedded in or independent of the processor of the base station in a hardware form, or may be stored in a memory of the network device 500 in a software form, so that the processor invokes and performs operations corresponding to the foregoing units.

Figure 6:
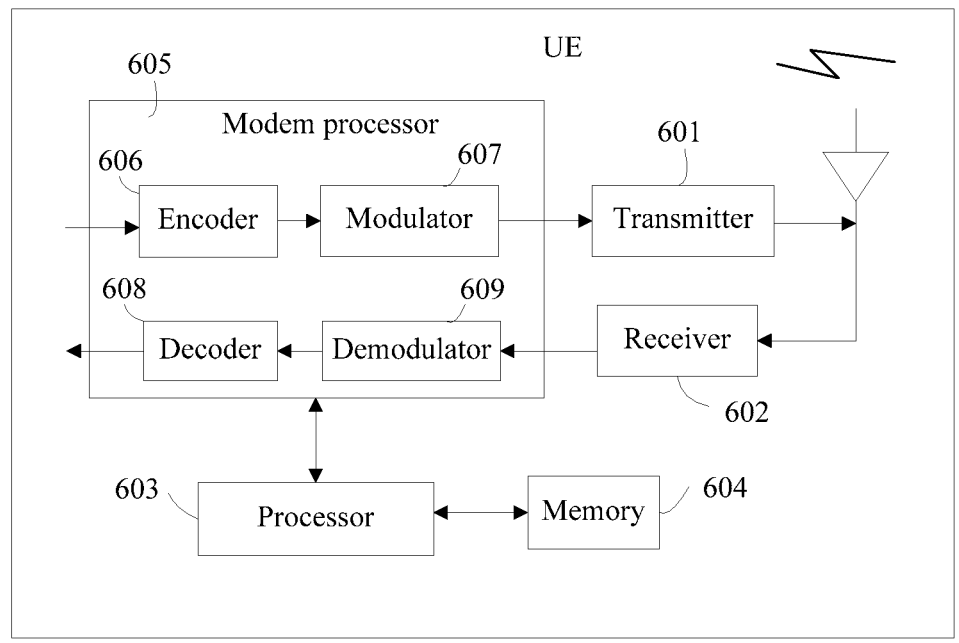
FIG. 6 is a schematic diagram of a possible design structure of UE according to an embodiment of the present invention.

That the network device 500 is UE is used as an example, and FIG. 6 is a schematic diagram of a possible design structure of UE according to an embodiment of the present invention. The UE includes a transmitter 601, a receiver 602, a processor 603, a memory 604, and a modem processor 605.

The transmitter 601 adjusts (for example, analog converts, filters, amplifies, and up-converts) output sampling and generates an uplink signal. The uplink signal is transmitted to the base station in the foregoing embodiments by using an antenna. On a downlink, the antenna receives a downlink signal transmitted by the base station in the foregoing embodiments. The receiver 602 adjusts (for example, filters, amplifies, down-converts, and digitizes) a signal received from the antenna and provides input sampling. In the modem processor 605, an encoder 606 receives service data and a signaling message that are to be sent on an uplink, and processes (for example, formats, encodes, and interleaves) the service data and the signaling message. A modulator 607 further processes (for example, performs symbol mapping and modulates) encoded service data and signaling message, and provides output sampling. A demodulator 609 processes (for example, demodulates) the input sampling and provides a symbol estimation. A decoder 608 processes (for example, de-interleaves and decodes) the symbol estimation and provides decoded data and signaling message that are to be sent to the UE. The encoder 606, the modulator 607, the demodulator 609, and the decoder 608 may be implemented by the combined modem processor 605. These units perform processing based on a radio access technology (for example, LTE and an access technology of another evolved system) used in a radio access network.

The processor 603 manages and controls actions of the UE, and is configured to perform an operation performed by the second network device or UE in the embodiment shown in FIG. 2, for example, receive the power configuration information and perform the CSI measurement. The memory 604 is configured to store program code and data that are used for the UE 600.

The network device 600 or the UE provided in this embodiment of the present invention is used, and the power configuration information configured for each of the at least two precoding matrix groups by a first network device is used for the CSI measurement. The power configuration information is used to indicate a power configuration of a corresponding precoding matrix group of the at least two precoding matrix groups, the at least two precoding matrix groups belong to a same resource used to measure CSI, and accuracy of the CSI measurement is high. This facilitates selection of a precoding matrix having good performance for data transmission, thereby optimizing a transmission process, and increasing a system capacity.

An embodiment of the present invention further provides a communications system, including a first network device, where the first network device may perform an operation performed by the first network device in the embodiment shown in FIG. 2, and may be specifically the network device in the embodiment of FIG. 3 or FIG. 4; and further including a second network device, where the second network device may perform an operation performed by the second network device in the embodiment shown in FIG. 2, and may be specifically the network device shown in the embodiment of FIG. 5 or FIG. 6. Details are not described herein.

It may be understood that, the processor used by the base station or the UE in the embodiments of the present invention may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. It may implement or execute various exemplary logical blocks, modules, and circuits that are described with reference to the contents disclosed in the present invention. The processor may also be a combination of computing functions, for example, a combination of one or more microprocessors or a combination of a DSP and a microprocessor.

The bus described in the embodiments of the present invention may be an industry standard architecture (Industry Standard Architecture, ISA) bus, a peripheral component interconnect (Peripheral Component Interconnect, PCI) bus, an extended industry standard architecture (Extended Industry Standard Architecture, EISA) bus, or the like. The bus may be categorized as an address bus, a data bus, a control bus, or the like. For ease of indication, the bus in the accompanying drawings of the present invention is indicated by using only one bold line. However, it does not indicate that there is only one bus or only one type of bus.

A person skilled in the art may clearly understand that, descriptions of the embodiments provided by the present invention may be reference for each other. For ease and brevity of description, for example, functions of the apparatuses and devices and performed operations that are provided in the embodiments of the present invention are briefly described, and for detailed content, refer to related descriptions in the method embodiments of the present invention.

The methods or algorithm steps described with reference to the content disclosed in the present invention may be implemented in a hardware manner, or may be implemented in a manner of executing a software instruction by a processor. The software instruction may include a corresponding software module. The software module may be stored in a RAM memory, a flash memory, a ROM memory, an EPROM memory, an EEPROM memory, a register, a hard disk, a removable hard disk, a CD-ROM memory, or a storage medium in any other forms well-known in the art. A storage medium used as an example is coupled to the processor, so that the processor can read information from the storage medium, and can write information into the storage medium. Certainly, the storage medium may be a part of the processor. The processor and the storage medium may be located in an ASIC. In addition, the ASIC may be located in user equipment. Certainly, the processor and the storage medium may exist in the user equipment as discrete components.

It should be understood that, in several embodiments provided in this application, the disclosed system, device and method may be implemented in other manners without departing from the scope of this application. For example, the described embodiment is only an example. For example, the module or unit division is only logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present invention without creative efforts.

In addition, the schematic diagrams illustrating the system, device, method and different embodiments may be combined or integrated with other systems, modules, technologies or methods without departing from the scope of this application. In addition, the displayed or discussed mutual couplings or direct couplings or communication connections may be implemented by using some interfaces. The indirect couplings or communication connections between the apparatuses or units may be implemented in electrical, mechanical, or other forms.

The descriptions are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
configuring, by a first communication apparatus, power configuration information for each of at least two precoding matrix groups, wherein the power configuration information indicates a power configuration of a corresponding precoding matrix group of the at least two precoding matrix groups, and the at least two precoding matrix groups belong to a same resource used to measure channel state information (CSI); and
sending, by the first communication apparatus, the power configuration information,
wherein the configuring, by a first communication apparatus, power configuration information for each of at least two precoding matrix groups comprises:
configuring, by the first communication apparatus, first power configuration information for a vertical precoding matrix group, and configuring second power configuration information for a horizontal precoding matrix group, wherein
the vertical precoding matrix group and the horizontal precoding matrix group belong to a same resource used to measure the CSI, the vertical precoding matrix group indicates a vertical beam after a horizontal direction is determined, and the horizontal precoding matrix group indicates a horizontal beam after a vertical direction is determined,
wherein the sending, by the first communication apparatus, the power configuration information comprises:
sending, by the first communication apparatus, signaling, wherein the signaling comprises the power configuration information,
wherein
the power configuration information comprises indication information and status information; and
the indication information indicates a power value of the precoding matrix group corresponding to the power configuration information, and the status information indicates an availability status of a precoding matrix in the precoding matrix group corresponding to the power configuration information,
wherein the signaling comprises at least two domains, the at least two domains comprise a time domain and a frequency domain; and
each of the at least two domains comprises the indication information and the status information in the power configuration information corresponding to one of the precoding matrix groups.

2. A communication method, comprising:
receiving, by a second communication apparatus, power configuration information, wherein the power configuration information is configured by a first communication apparatus for each of at least two precoding matrix groups, the power configuration information indicates a power configuration of a corresponding precoding matrix group of the at least two precoding matrix groups, and the at least two precoding matrix groups belong to a same resource used to measure channel state information (CSI); and
performing, by the second communication apparatus, CSI measurement based on the power configuration information,
wherein the power configuration information comprises first power configuration information for a vertical precoding matrix group, and second power configuration information for a horizontal precoding matrix group, wherein the vertical precoding matrix group and the horizontal precoding matrix group belong to a same resource used to measure the CSI, the vertical precoding matrix group indicates a vertical beam after a horizontal direction is determined, and the horizontal precoding matrix group indicates a horizontal beam after a vertical direction is determined, wherein the receiving, by a second communication apparatus, power configuration information comprises:

receiving, by the second communication apparatus, signaling from the first communication apparatus, wherein the signaling comprises the power configuration information, wherein the power configuration information comprises indication information and status information; and the indication information indicates a power value of the precoding matrix group corresponding to the power configuration information, and the status information indicates an availability status of a precoding matrix in the precoding matrix group corresponding to the power configuration information, wherein the signaling comprises at least two domains, the at least two domains comprise a time domain and a frequency domain; and each of the at least two domains comprises the indication information and the status information in the power configuration information corresponding to one of the precoding matrix groups.

3. A communication apparatus, comprising a processor, and a transceiver, wherein the transceiver is configured to perform communication between the communication apparatus and another communication apparatus; and the processor is configured to execute instruction to enable the communication apparatus to perform:

configuring, power configuration information for each of at least two precoding matrix groups, wherein the power configuration information indicates a power configuration of a corresponding precoding matrix group of the at least two precoding matrix groups, and the at least two precoding matrix groups belong to a same resource used to measure channel state information (CSI); and sending, the power configuration information, wherein the configuring power configuration information for each of at least two precoding matrix groups comprises:

configuring first power configuration information for a vertical precoding matrix group, and configuring second power configuration information for a horizontal precoding matrix group, wherein the vertical precoding matrix group and the horizontal precoding matrix group belong to a same resource used to measure the CSI, the vertical precoding matrix group indicates a vertical beam after a horizontal direction is determined, and the horizontal precoding matrix group indicates a horizontal beam after a vertical direction is determined, wherein the sending, the power configuration information, comprises:

sending signaling, wherein the signaling comprises the power configuration information, wherein the power configuration information comprises indication information and status information; and the indication information indicates a power value of the precoding matrix group corresponding to the power configuration information, and the status information indicates an availability status of a precoding matrix in the precoding matrix group corresponding to the power configuration information, wherein the signaling comprises at least two domains, the at least two domains comprise a time domain and a frequency domain; and each of the at least two domains comprises the indication information and the status information in the power configuration information corresponding to one of the precoding matrix groups.

4. A communication apparatus, comprising a processor, and a transceiver, wherein the transceiver is configured to perform communication between the communication apparatus and another communication apparatus; and the processor is configured to execute instruction, to enable the communication apparatus to perform:

receiving, power configuration information, wherein the power configuration information is configured by a first communication apparatus for each of at least two precoding matrix groups, the power configuration information indicates a power configuration of a corresponding precoding matrix group of the at least two precoding matrix groups, and the at least two precoding matrix groups belong to a same resource used to measure channel state information (CSI); and performing, CSI measurement based on the power configuration information, wherein the power configuration information comprises first power configuration information for a vertical precoding matrix group, and second power configuration information for a horizontal precoding matrix group, wherein the vertical precoding matrix group and the horizontal precoding matrix group belong to a same resource used to measure the CSI, the vertical precoding matrix group indicates a vertical beam after a horizontal direction is determined, and the horizontal precoding matrix group indicates a horizontal beam after a vertical direction is determined, wherein the receiving, power configuration information comprises:

receiving, signaling from the first communication apparatus, wherein the signaling comprises the power configuration information, wherein the power configuration information comprises indication information and status information; and the indication information indicates a power value of the precoding matrix group corresponding to the power configuration information, and the status information indicates an availability status of a precoding matrix in the precoding matrix group corresponding to the power configuration information, wherein the signaling comprises at least two domains, the at least two domains comprise a time domain and a frequency domain; and each of the at least two domains comprises the indication information and the status information in the power configuration information corresponding to one of the precoding matrix groups.

* * * * *